United States Patent
Asakawa et al.

(10) Patent No.: US 10,641,125 B2
(45) Date of Patent: May 5, 2020

(54) NOZZLE DRIVE MECHANISM, TURBOCHARGER, AND VARIABLE-CAPACITY TURBOCHARGER

(71) Applicant: IHI Corporation, Koto-ku (JP)

(72) Inventors: Takao Asakawa, Tokyo (JP); Kenichi Segawa, Tokyo (JP); Takahiro Kobayashi, Tokyo (JP); Ryota Sakisaka, Tokyo (JP); Kazuko Takeuchi, Tokyo (JP); Kenji Bunno, Tokyo (JP)

(73) Assignee: IHI Corporation, Koto-ku (JP)

( * ) Notice: Subject to any disclaimer, the term of this patent is extended or adjusted under 35 U.S.C. 154(b) by 4 days.

(21) Appl. No.: 16/104,172

(22) Filed: Aug. 17, 2018

(65) Prior Publication Data
US 2018/0363493 A1 Dec. 20, 2018

Related U.S. Application Data

(63) Continuation of application No. PCT/JP2017/007506, filed on Feb. 27, 2017.

(30) Foreign Application Priority Data

Mar. 3, 2016 (JP) ................................. 2016-041077

(51) Int. Cl.
F01D 17/16 (2006.01)
F02B 37/24 (2006.01)

(52) U.S. Cl.
CPC ............ F01D 17/165 (2013.01); F02B 37/24 (2013.01); F05D 2220/40 (2013.01); F05D 2240/128 (2013.01); Y02T 10/144 (2013.01)

(58) Field of Classification Search
CPC ...... F01D 17/165; F01D 17/167; F01D 17/16; F02B 37/24; Y02T 10/144; F04D 15/0022; F04D 15/0038
See application file for complete search history.

(56) References Cited

U.S. PATENT DOCUMENTS 7,406,826 B2 * 8/2008 Hayashi ................ F01D 17/165
                                                                60/602
9,308,576 B2 * 4/2016 Ramb ................... F01D 17/165
(Continued)

FOREIGN PATENT DOCUMENTS

CN 102966381 A 3/2013
CN 103080497   5/2013
(Continued)

OTHER PUBLICATIONS

International Preliminary Report on Patentability and Written Opinion dated Sep. 13, 2018 in PCT/JP2017/007506 (English Translation only), 9 pages.

(Continued)

Primary Examiner — Eldon T Brockman
(74) Attorney, Agent, or Firm — Oblon, McClelland, Maier & Neustadt, L.L.P.

(57) ABSTRACT

A nozzle drive mechanism includes: a plurality of nozzle vanes; a plurality of link plates each fixed to a shaft portion of one of the plurality of nozzle vanes; a nozzle ring having an annular main body portion including shaft holes, each of which pivotally supporting a shaft portion of one of the nozzle vanes, the nozzle ring arranged between the link plates and the nozzle vanes; a regulation pin having one end attached to the main body portion of the nozzle ring and the other end protruding from an opposing surface of one of the link plates facing the nozzle ring; and a positioning pin provided separately from the regulation pin and assembled to a wall portion positioned opposite to the nozzle ring across the link plate at a position where the positioning pin is brought into contact when the nozzle ring rotates.

9 Claims, 5 Drawing Sheets

(56) References Cited

U.S. PATENT DOCUMENTS

| | | | |
|---|---|---|---|
| 9,784,119 B2* | 10/2017 | Tashiro | F02B 37/24 |
| 9,784,178 B2* | 10/2017 | Tashiro | F01D 17/165 |
| 2007/0068155 A1 | 3/2007 | Hayashi et al. | |
| 2012/0121392 A1 | 5/2012 | Azuma | |
| 2012/0308376 A1 | 12/2012 | Scholz et al. | |
| 2013/0084161 A1 | 4/2013 | Groves et al. | |
| 2013/0180106 A1 | 7/2013 | Ramb et al. | |
| 2014/0147254 A1* | 5/2014 | Tashiro | F01D 17/165 415/146 |
| 2014/0178181 A1 | 6/2014 | Tashiro et al. | |
| 2017/0022891 A1 | 1/2017 | Arai et al. | |

FOREIGN PATENT DOCUMENTS

| | | |
|---|---|---|
| CN | 103649491 | 3/2014 |
| CN | 103649492 | 3/2014 |
| CN | 105723068 | 6/2016 |
| DE | 197 31 715 A1 | 1/1998 |
| DE | 11 2011 103 045 T5 | 7/2013 |
| EP | 2 535 524 A2 | 12/2012 |
| EP | 2 562 429 A2 | 2/2013 |
| EP | 2 762 699 A1 | 8/2014 |
| EP | 2 762 700 A1 | 8/2014 |
| EP | 3 085 920 A1 | 10/2016 |
| JP | 10-037754 | 2/1998 |
| JP | 10-089082 | 4/1998 |
| JP | 2002-206427 | 7/2002 |
| JP | 2007-056791 | 3/2007 |
| JP | 2010-013983 | 1/2010 |
| JP | 2011-085054 | 4/2011 |
| JP | 2013-072401 | 4/2013 |
| JP | 2013-072404 | 4/2013 |
| JP | 2013-189898 | 9/2013 |
| JP | 2013-537958 | 10/2013 |
| JP | 5353635 | 11/2013 |
| JP | 2015-113824 | 6/2015 |
| KR | 10-2014-0001868 | 1/2014 |
| WO | WO 2012/043125 A1 | 4/2012 |
| WO | WO 2012/047527 A2 | 4/2012 |
| WO | WO 2013/047123 A1 | 4/2013 |
| WO | WO 2013/047153 A1 | 4/2013 |
| WO | WO 2015/092843 A1 | 6/2015 |

OTHER PUBLICATIONS

International Search Report dated May 16, 2017 in PCT/JP2017/007506 filed Feb. 27, 2017 (with English Translation).

Written Opinion dated May 16, 2017 in PCT/JP2017/007506 filed Feb. 27, 2017.

Combined Office Action and Search Report dated Nov. 29, 2019 in Chinese Patent Application No. 201780012594.X, 11 pages (with English translation and English translation of categories of cited documents).

* cited by examiner

NOZZLE DRIVE MECHANISM, TURBOCHARGER, AND VARIABLE-CAPACITY TURBOCHARGER

CROSS REFERENCE TO RELATED APPLICATIONS

This application is a continuation application of International Application No. PCT/JP2017/007506, filed on Feb. 27, 2017, which claims priority to Japanese Patent Application No. 2016-041077, filed on Mar. 3, 2016, the entire contents of which are incorporated by reference herein.

BACKGROUND ART

Technical Field

The present disclosure relates to a nozzle drive mechanism, a turbocharger, and a variable-capacity turbocharger in which a plurality of nozzle vanes is displaced by link plates.

Related Art

Conventionally, turbochargers of a variable-capacity type are widely used. In such a turbocharger, for example as illustrated in Patent Literature 1, a plurality of nozzle vanes are arranged while annularly aligned in a flow passage for guiding exhaust gas from a turbine scroll passage to a turbine impeller. The nozzle vanes are attached to a bladed shaft. When the bladed shaft rotates by the power of an actuator, the angles of the nozzle vanes change in the flow passage as the bladed shaft rotates. The flow passage width (so-called nozzle throat width) changes, and thus the flow rate of exhaust gas flowing through the flow passage is controlled.

The bladed shaft is supported by a shaft hole provided in a nozzle ring. A link plate is attached to an end portion of the bladed shaft projecting from the nozzle ring. When the link plate swings by the power of the actuator, the bladed shaft and the nozzle vanes rotate. In addition, one end of a positioning pin is press-fitted to the nozzle ring. The other end of the positioning pin is inserted through a housing. With this positioning pin, members such as the nozzle ring and the link plate provided to the nozzle ring are positioned with respect to the housing. Furthermore, the positioning pin restricts the link plate from rotating around the bladed shaft from a predetermined position.

CITATION LIST

Patent Literature

Patent Literature 1: Japanese Patent No. 5353635 B2

SUMMARY

Technical Problem

Meanwhile, press fitting of a positioning pin into a nozzle ring may be performed after a nozzle vane is attached to the nozzle ring. This is to avoid interference with a tool such as at the time of assembling a separate member. At this time, it is necessary to control the depth of press-fitting or the load at the time of press-fitting in order to avoid that an excessive load acts on the member assembled to the nozzle vane. In a case where, for example, control of the load of press-fitting or the position of the depth with is performed with a fine accuracy using a press-fitting device or other devices at the time of assembling, this may disadvantageously affect productivity.

An object of the present disclosure is to provide a nozzle drive mechanism, a turbocharger, and a variable-capacity turbocharger that can improve productivity.

Solution to Problem

In order to solve the problems described above, a nozzle drive mechanism according to one embodiment of the present disclosure includes: a plurality of link plates each provided to a shaft portion of one of a plurality of nozzle vanes; a nozzle ring having an annular main body portion including shaft holes, each of which pivotally supporting a shaft portion of one of the nozzle vanes, the nozzle ring arranged between the link plates and the nozzle vanes; a regulation pin having one end side thereof attached to the main body portion of the nozzle ring and the other end thereof protruding from an opposing surface of one of the link plates facing the nozzle ring; and a positioning pin provided separately from the regulation pin and assembled to a wall portion positioned opposite to the nozzle ring across the link plate.

The positioning pin may be provided at a position where the positioning pin is brought into contact when the nozzle ring rotates.

A ring hole, penetrating through the main body portion of the nozzle ring and into which the end of the regulation pin is press-fitted to a position in the nozzle ring that is flush with an open surface positioned on a side opposite to the link plates, may be provided.

An insertion hole formed in the wall portion and into which the positioning pin is inserted may be provided.

A positioning portion, which is formed in the main body portion of the nozzle ring and is formed by a hole or a groove through which the positioning pin is inserted, and an inner wall surface of which positioned inward in a radial direction of the main body portion with respect to the positioning pin is spaced apart from the positioning pin, may be provided.

In order to solve the above problems, a turbocharger according to an aspect of the present disclosure includes the nozzle drive mechanism described above.

In order to solve the above problems, a variable-capacity turbocharger according to one embodiment of the present disclosure includes: a nozzle drive mechanism having a plurality of nozzle vanes and a plurality of link plates each provided to a shaft portion of one of the plurality of nozzle vanes; an annular main body portion including shaft holes, each of which pivotally supporting a shaft portion of one of the nozzle vanes; a nozzle ring arranged between the link plates and the nozzle vanes; a regulation pin having one end fixed to the main body portion of the nozzle ring and the other end protruding from an opposing surface of one of the link plates facing the nozzle ring; a positioning pin provided separately from the regulation pin and assembled to a wall portion, of a housing, positioned opposite to the nozzle ring across the link plate; and a housing hole formed in the wall portion and into which the positioning pin is inserted.

Effects of Disclosure

According to the present disclosure, productivity can be improved.

DESCRIPTION OF EMBODIMENT

Embodiment of the present disclosure will be described in detail below with reference to the accompanying drawings. Dimensions, materials, other specific numerical values, and the like illustrated in embodiment are merely examples for facilitating understanding, and the present disclosure is not limited thereby except for a case where it is specifically mentioned. Note that, in the present specification and the drawings, elements having substantially the same function and structure are denoted by the same symbol, and redundant explanations are omitted. Components not directly related to the present disclosure are not illustrated.

Figure 1:
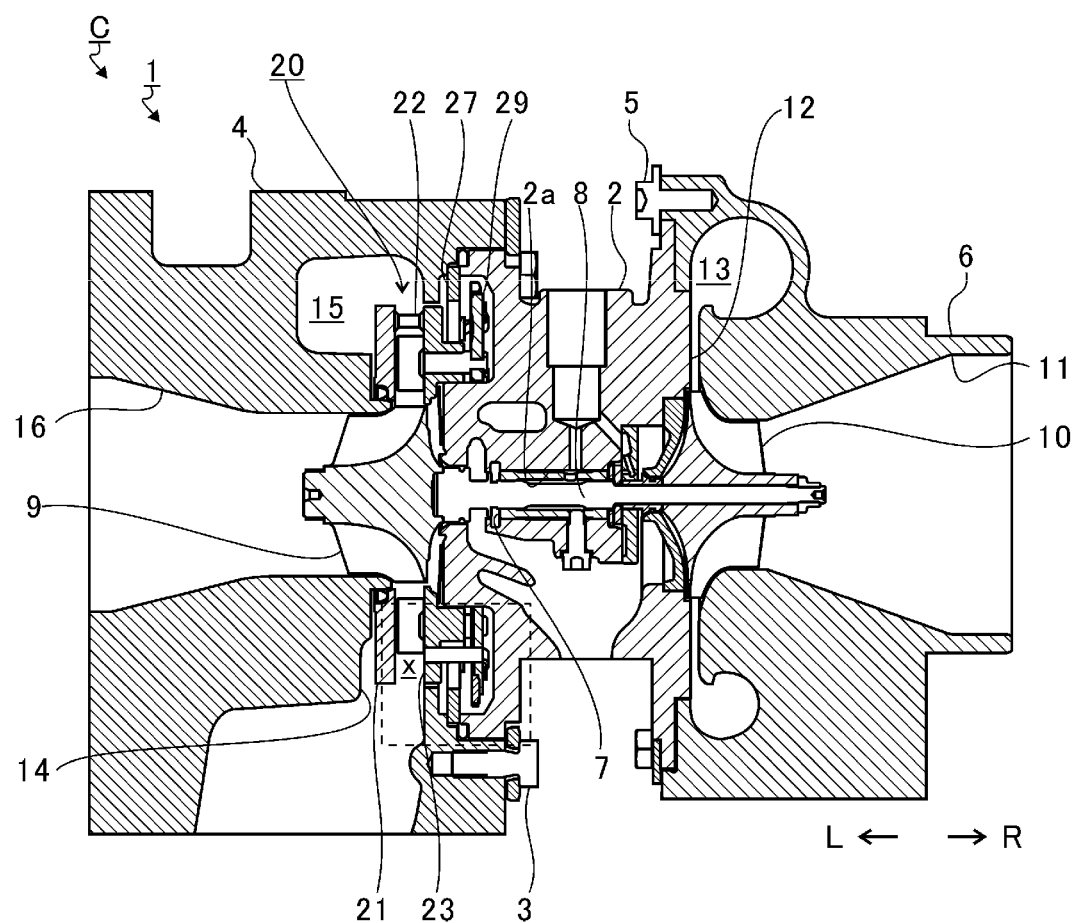
FIG. 1 is a schematic cross-sectional view of a variable-capacity turbocharger (turbocharger).

FIG. 1 is a schematic cross-sectional view of a variable-capacity turbocharger C (turbocharger). Hereinafter, descriptions are given assuming that a direction of an arrow L illustrated in FIG. 1 is the left side of the variable-capacity turbocharger C. Descriptions are given assuming that a direction of an arrow R illustrated in FIG. 1 is the right side of the variable-capacity turbocharger C. As illustrated in FIG. 1, the variable-capacity turbocharger C includes a turbocharger main body 1. The turbocharger main body 1 includes a bearing housing 2 (housing). A turbine housing 4 (housing) is connected to the left side of the bearing housing 2 by a fastening bolt 3. A compressor housing 6 is connected to the right side of the bearing housing 2 by a fastening bolt 5. The bearing housing 2, the turbine housing 4, and the compressor housing 6 are integrated.

A receiving hole 2a is formed in the bearing housing 2. The receiving hole 2a penetrates in a lateral direction of the variable-capacity turbocharger C. A shaft 8 is pivotally supported in a freely rotatable manner by a radial bearing 7 (a semi-floating bearing is illustrated in FIG. 1 as an example in this embodiment) accommodated in the receiving hole 2a. At a left end portion of the shaft 8, a turbine impeller 9 is provided. The turbine impeller 9 is accommodated in the turbine housing 4 in a freely rotatable manner. Furthermore, a compressor impeller 10 is provided at a right end portion of the shaft 8. The compressor impeller 10 is accommodated in the compressor housing 6 in a freely rotatable manner.

An intake port 11 is formed in the compressor housing 6. The intake port 11 opens to the right side of the variable-capacity turbocharger C. The intake port 11 is connected to an air cleaner (not illustrated). Furthermore, in a state where the bearing housing 2 and the compressor housing 6 are connected by the fastening bolt 5, a diffuser flow passage 12 is formed. The diffuser flow passage 12 is formed by opposing surfaces of the bearing housing 2 and the compressor housing 6. The diffuser flow passage 12 pressurizes the air. The diffuser flow passage 12 is annularly formed so as to extend from a radially inner side to a radially outer side of the shaft 8. The diffuser flow passage 12 communicates with the intake port 11 via the compressor impeller 10 on an inner side in the radial direction of the shaft 8.

Furthermore, the compressor housing 6 includes a compressor scroll flow passage 13. The compressor scroll flow passage 13 is annular. The compressor scroll flow passage 13 is positioned on an outer side in the radial direction of the shaft 8 with respect to the diffuser flow passage 12. The compressor scroll flow passage 13 communicates with an intake port of an engine (not illustrated). The compressor scroll flow passage 13 also communicates with the diffuser flow passage 12. When the compressor impeller 10 rotates, therefore, the air is sucked into the compressor housing 6 from the intake port 11. The sucked air is accelerated and pressurized in the process of flowing through blades of the compressor impeller 10. The accelerated and pressurized air is further pressurized (recovered of the pressure) by the diffuser flow passage 12 and the compressor scroll flow passage 13. The pressurized air is guided to the engine.

In a state where the bearing housing 2 and the turbine housing 4 are coupled by the fastening bolt 3, a clearance 14 is formed between opposing surfaces of the bearing housing 2 and the turbine housing 4. The clearance 14 is a portion where a flow passage x is formed. In the flow passage x, a nozzle vane 26 which will be described later is arranged. Exhaust gas flows through the flow passage x. The clearance 14 is annularly formed so as to extend from a radially inner side to a radially outer side of the shaft 8 (turbine impeller 9).

An exhaust port 16 is formed in the turbine housing 4. The exhaust port 16 communicates with the turbine scroll flow passage 15 via the turbine impeller 9. The exhaust port 16 faces a front surface of the turbine impeller 9. The exhaust port 16 is connected to an exhaust gas purification device (not illustrated).

The turbine scroll flow passage 15 communicates with a gas inlet port (not illustrated). Exhaust gas discharged from the engine is guided to the gas inlet port. The turbine scroll flow passage 15 communicates also with the flow passage x. Therefore, exhaust gas guided from the gas inlet port to the turbine scroll flow passage 15 is guided to the exhaust port 16 via the flow passage x and the turbine impeller 9. That is, the flow passage x runs from the turbine scroll flow passage 15 to the turbine impeller 9. The exhaust gas rotates the turbine impeller 9 in the process of flowing from the flow passage x to the exhaust port 16. Then, the turning force of the turbine impeller 9 is then transmitted to the compressor impeller 10 via the shaft 8. The turning force of the compressor impeller 10 causes the air to be pressurized and guided to the intake port of the engine.

At this time, when a flow rate of the exhaust gas guided to the turbine housing 4 changes, the rotation amounts of the turbine impeller 9 and the compressor impeller 10 change. Depending on an operation status of the engine, there may be a case where the air pressurized to a desired pressure cannot be sufficiently guided to the intake port of the engine. Therefore, the variable-capacity turbocharger C is provided with a nozzle drive mechanism 20.

The nozzle drive mechanism 20 changes the width (nozzle throat width which will be described later) of the flow passage x of the turbine housing 4. The nozzle drive mechanism 20 changes the flow velocity of exhaust gas guided to the turbine impeller 9 depending on the flow rate of the exhaust gas. Specifically, in a case where the rotational speed of the engine is low and the flow rate of exhaust gas is small, the nozzle drive mechanism 20 reduces the degree of nozzle opening of the flow passage x to improve the flow velocity of exhaust gas guided to the turbine impeller 9. In this manner, the nozzle drive mechanism 20 allows the turbine impeller 9 to rotate even with a small flow rate. A configuration of the nozzle drive mechanism 20 will be described below.

Figure 2:
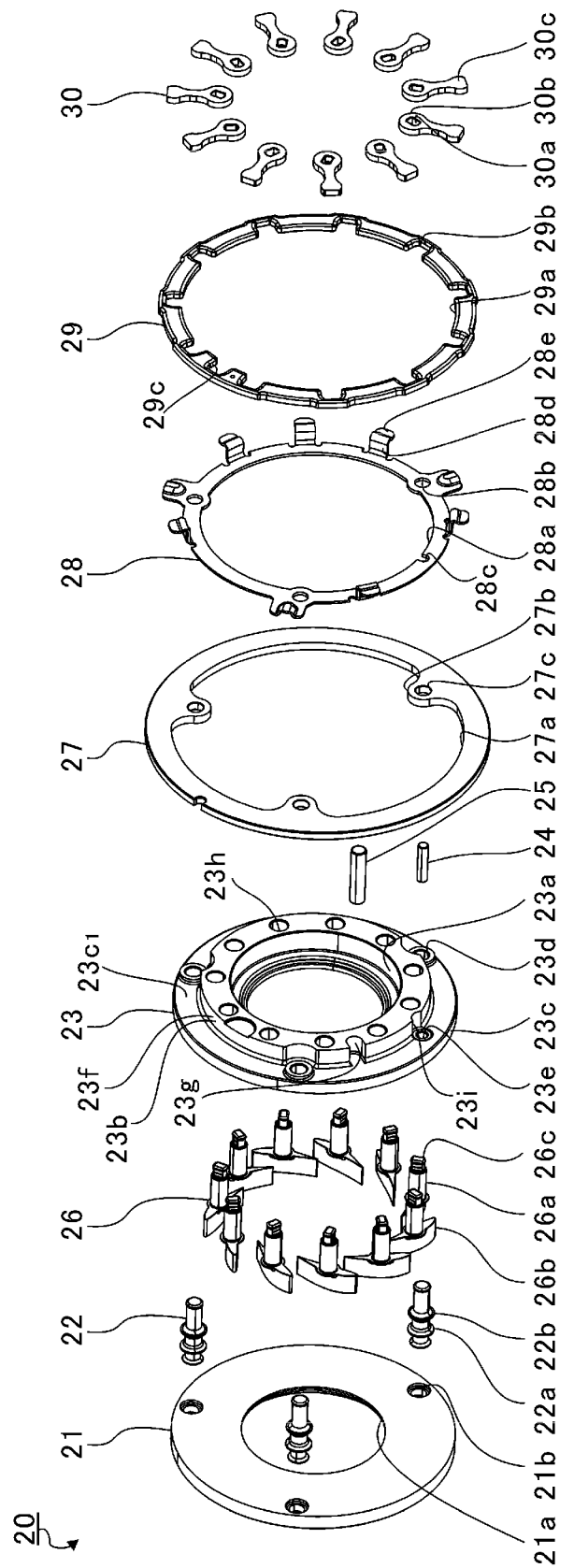
FIG. 2 is an exploded perspective view of a nozzle drive mechanism.

FIG. 2 is an exploded perspective view of the nozzle drive mechanism 20. As illustrated in FIG. 2, the nozzle drive mechanism 20 has a CC plate 21. A plate shaft hole 21a is formed in the CC plate 21. The plate shaft hole 21a penetrates in the axial direction of the shaft 8. The CC plate 21 has, for example, a flat plate shape having a circular cross-sectional shape perpendicular to the axial direction of the shaft 8. On an outer circumferential surface side of the CC plate 21, a plate pin hole 21b is provided. The plate pin hole 21b penetrates the CC plate 21 in an axial direction of the shaft 8 (hereinafter referred to as the axial direction).

A plurality of plate pin holes 21b (three in this case) is provided while spaced apart from each other in the circumferential direction of the CC plate 21. One end of a CC pin 22 is inserted through each of the plate pin holes 21b.

The nozzle ring 23 is located on the compressor impeller 10 side (the right side in FIG. 1) with respect to the CC plate 21. The nozzle ring 23 has an annular main body portion 23b. A ring shaft hole 23a is formed in the main body portion 23b. The ring shaft hole 23a penetrates the main body portion 23b in the axial direction of the shaft 8. On the CC plate 21 side of the main body portion 23b, a flange portion 23c of an annular shape is provided. The flange portion 23c protrudes radially outward from the main body portion 23b. That is, the flange portion 23c is provided on the outer side in the radial direction of the main body portion 23b. A step surface $23c_1$ connects a step between the main body portion 23b and the flange portion 23c. The step surface $23c_1$ extends in the radial direction. Ring pin holes 23d are formed at opposing portions of the flange portion 23c facing the plate pin holes 21b of the CC plate 21. The ring pin holes 23d penetrate the flange portion 23c in the axial direction. A CC pin 22 is inserted into each of the ring pin holes 23d.

The CC pin 22 has a first annular protrusion 22a. The first annular protrusion 22a protrudes in the radial direction. An outer diameter of the first annular protrusion 22a is larger than an inner diameter of a plate pin hole 21b. Therefore, when the CC pin 22 is inserted through the plate pin hole 21b, the first annular protrusion 22a is brought into contact with an opposing surface of the CC plate 21 facing the nozzle ring 23. Thus, an insertion position of the CC pin 22 in the plate pin hole 21b is determined.

Likewise, the CC pin 22 has a second annular protrusion 22b. The second annular protrusion 22b protrudes in the radial direction. The second annular protrusion 22b is positioned on the other end side with respect to the first annular protrusion 22a. An outer diameter of the second annular protrusion 22b is larger than an inner diameter of a ring pin hole 23d. Therefore, when the CC pin 22 is inserted through the ring pin hole 23d, the second annular protrusion 22b is brought into contact with an opposing surface of the nozzle ring 23 facing the CC plate 21. Thus, an insertion position of the CC pin 22 in the ring pin hole 23d is determined.

As described above, an interval between the CC plate 21 and the nozzle ring 23 facing each other is defined by the CC pin 22. The flow passage x described above is formed by a clearance where the CC plate 21 and the nozzle ring 23 face each other. The length in the axial direction of the flow passage x is defined by the CC pin 22.

A ring hole 23e is provided in the flange portion 23c of the nozzle ring 23. The position of the ring hole 23e in the circumferential direction is different from that of the ring pin hole 23d. The ring hole 23e penetrates through the flange portion 23c in the axial direction. The regulation pin 24 is press-fitted into the ring hole 23e.

A positioning portion 23g is provided on an outer circumferential surface 23f of the main body portion 23b. The positioning portion 23g is formed by a groove (notch) recessed radially inward. A positioning pin 25 provided separately from the regulation pin 24 is inserted through the positioning portion 23g.

The position of the positioning portion 23g in the circumferential direction of the main body portion 23b is different from that of the ring hole 23e. The positioning portion 23g extends farther inward in the radial direction of the main body portion 23b than the ring hole 23e does. The ring hole 23e extends farther outward in the radial direction of the main body portion 23b than the positioning portion 23g does. Note that the positioning portion 23g may extend farther outward in the radial direction of the main body portion 23b than the ring hole 23e does. The ring hole 23e may extend farther inward in the radial direction of the main body portion 23b than the positioning portion 23g does. The regulation pin 24 and the positioning pin 25 will be described later in detail.

Bladed shaft holes 23h (shaft hole) are formed in the main body portion 23b. The bladed shaft holes 23h are formed at positions spaced apart from the positioning portion 23g in the circumferential direction. A bladed shaft hole 23h penetrates through the main body portion 23b in the axial direction. Multiple (eleven in this case) bladed shaft holes 23h are provided while spaced apart from each other in the rotation direction of the turbine impeller 9 (circumferential direction of the main body portion 23b).

Like the bladed shaft holes 23h, multiple (eleven in this case) nozzle vanes 26 are provided while spaced apart from each other in the rotation direction of the turbine impeller 9. Here, the rotation direction of the turbine impeller 9 is substantially the same as the circumferential direction of the CC plate 21 or the circumferential direction of the main body portion 23b of the nozzle ring 23. Being substantially the same includes a case where the rotation direction of the turbine impeller 9 is misaligned from the circumferential direction of the CC plate 21 or the circumferential direction of the main body portion 23b of the nozzle ring 23. This misalignment may be caused by structural variations such as whirling during rotation of the turbine impeller 9, assembling of members, or accuracy of member dimensions.

A blade body 26b is positioned in the clearance (that is, the flow passage x) between the CC plate 21 and the nozzle ring 23. A shaft portion 26a protruding from the blade body 26b toward the nozzle ring 23 is pivotally supported by a bladed shaft hole 23h (holding on one end side). Here, the case where the shaft portion 26a is pivotally supported by the nozzle ring 23 has been described. However, the CC plate 21 may also be formed with a hole for pivotally supporting the shaft portion 26a.

A support ring 27 is an annular member. The support ring 27 includes a support shaft hole 27a. In the support shaft hole 27a, the main body portion 23b of the nozzle ring 23 is inserted from the left side in FIG. 2. The regulation pin 24 and the positioning pin 25 are inserted through the inside of the support shaft hole 27a. Protruding portions 27b are formed on an inner circumferential surface of the support shaft hole 27a. A protruding portion 27b protrudes radially inward from the inner circumferential surface of the support shaft hole 27a. A plurality of (three in this case) protruding portions 27b are formed to match with the ring pin holes 23d. A protruding portion 27b includes a support pin hole 27c. The support pin hole 27c is provided at a position facing the ring pin hole 23d. The support pin hole 27c penetrates the protruding portion 27b in the axial direction. In a state where the bearing housing 2 and the turbine housing 4 are fastened together, for example, an outer circumferential portion of the support ring 27 is clamped between the bearing housing 2 and the turbine housing 4.

A drive ring support 28 is an annular member. The drive ring support 28 is positioned on the side opposite to the flange portion 23c of the nozzle ring 23 with respect to the support ring 27. Like the support ring 27, a drive support shaft hole 28a is formed in the drive ring support 28. In the drive support shaft hole 28a, the main body portion 23b of the nozzle ring 23 is inserted from the left side in FIG. 2. The drive ring support 28 further includes drive support pin holes 28b. The drive support pin holes 28b are provided at positions facing the support pin holes 27c. A drive support pin hole 28b penetrates through the drive ring support 28 in the axial direction. Furthermore, a groove 28c is provided on an inner circumferential surface of the drive support shaft hole 28a. The groove 28c is recessed radially outward from the inner circumferential surface of the drive support shaft hole 28a. The regulation pin 24 is inserted (enters) through the groove 28c. Meanwhile, no groove through which the positioning pin 25 is inserted is formed on the inner circumferential surface of the drive support shaft hole 28a. The positioning pin 25 is inserted through the inside of the drive support shaft hole 28a.

Locking portions 28d are provided on an outer circumference of the drive ring support 28. A locking portion 28d protrudes rightward in the axial direction in FIG. 2 (away from the support ring 27). A bent portion 28e is formed at a tip of a locking portion 28d. The bent portion 28e is bent outward in the radial direction of the drive ring support 28.

Figure 3:
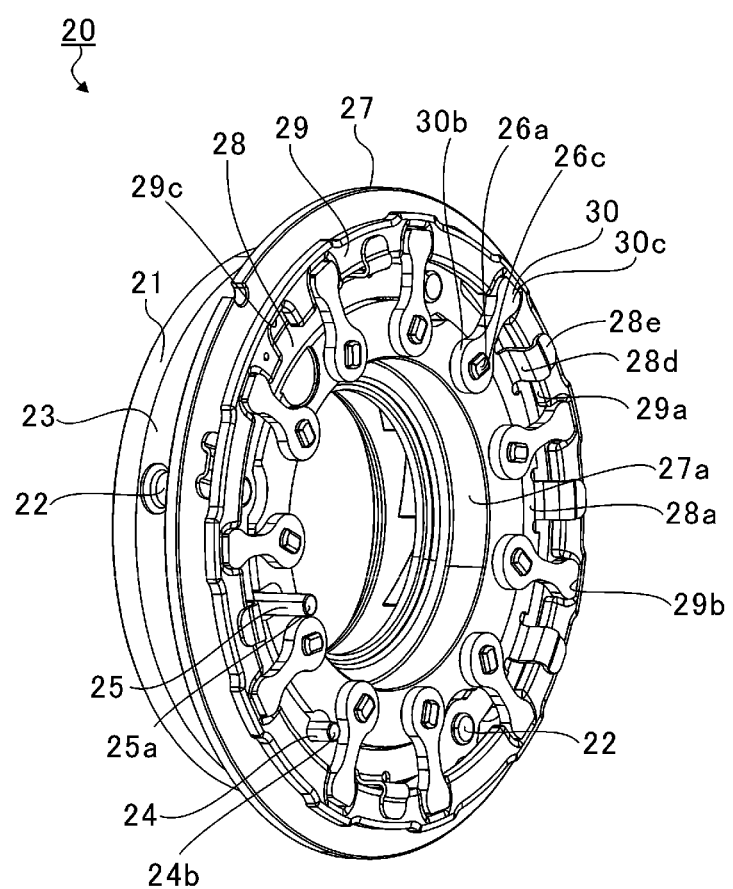
FIG. 3 is a perspective view of the nozzle drive mechanism after assembling.

FIG. 3 is a perspective view of the nozzle drive mechanism 20 after assembling. As illustrated in FIG. 3, a CC pin 22 is inserted through a plate pin hole 21b, a ring pin hole 23d, a support pin hole 27c, and a drive support pin hole 28b (see FIG. 2), and both ends of the CC pin 22 are caulked. In this manner, the CC plate 21, the nozzle ring 23, the support ring 27, and the drive ring support 28 are assembled. In this manner, the nozzle drive mechanism 20 is held inside the bearing housing 2 and the turbine housing 4, for example, via the support ring 27.

A drive ring 29 is an annular member. The drive ring 29 has a drive shaft hole 29a. The drive shaft hole 29a penetrates through the drive ring 29 in the axial direction. An inner diameter of the drive shaft hole 29a is larger than the locking portions 28d of the drive ring support 28. With respect to the drive ring 29, the drive ring support 28 is inserted through the drive shaft hole 29a of the drive ring 29 from the right side in FIG. 2. The locking portions 28d of the drive ring support 28 are positioned inside the drive shaft hole 29a. The bent portions 28e are positioned on the right side in FIG. 2 with respect to the drive ring 29. The drive ring 29 is interposed between the support ring 27 and the bent portions 28e. The drive ring 29 is supported by the locking portions 28d from the inside in the radial direction.

A tip portion 26c of a shaft portion 26a of a nozzle vane 26 protrudes from a bladed shaft hole 23h of the nozzle ring 23. The tip portion 26c of the shaft portion 26a is inserted through a support shaft hole 27a of the support ring 27, a drive support shaft hole 28a of the drive ring support 28, and a drive shaft hole 29a of the drive ring 29. The tip portion 26c of the shaft portion 26a is inserted through a link plate 30.

The same number of link plates 30 as that of the nozzle vanes 26 are provided. Each of the plurality of link plates 30 has a main body 30b. In the main body 30b, a plate hole 30a (see FIG. 2) is formed. A tip portion 26c of a shaft portion 26a is inserted through the plate hole 30a. The main body 30b is arranged inside the drive shaft hole 29a of the drive ring 29. A link protrusion 30c is formed in the main body 30b. The link protrusion 30c protrudes from the main body 30b toward the inner circumferential surface of the drive shaft hole 29a.

Fitting grooves 29b are provided on the inner circumference of the drive shaft hole 29a of the drive ring 29. A fitting groove 29b is recessed radially outward. The same number of fitting grooves 29b as that of the nozzle vanes 26 are provided while spaced apart in the circumferential direction of the drive shaft hole 29a. A link protrusion 30c is fitted into each of the fitting grooves 29b. In a link plate 30, a tip portion 26c of a shaft portion 26a inserted through a plate hole 30a of a main body 30b is caulked. The link plate 30 and the shaft portion 26a integrally rotate.

Here, in the drive ring 29, a drive groove 29c is provided on the inner circumference of the drive shaft hole 29a. The drive groove 29c has roughly the same shape as that of the fitting grooves 29b. The position of the drive groove 29c in the circumferential direction is different from those of the fitting grooves 29b. One end side of a drive link (not illustrated) is fitted into the drive groove 29c. The drive link has roughly the same shape as those of the link plates 30. The other end side of the drive link is, for example, caulked to one end side of a shaft member. The shaft member is supported by a cylindrical bearing member attached to the bearing housing 2. Furthermore, the other end side of the shaft member is welded to a coupling member. The coupling member has a flat plate shape. The coupling member is coupled to the actuator. The coupling member protrudes to the outside of the bearing housing. Power of the actuator (not illustrated) is transmitted to the drive ring 29 via the drive link. As a result, the drive ring 29 rotates (slides) while supported by the locking portions 28d of the drive ring support 28.

When the drive ring 29 rotates, the link protrusions 30c fitted in the fitting grooves 29b are pressed by the drive ring 29 in the rotation direction. The link plates 30 rotate (fluctuates) around the axis of the shaft portion 26a. As a result, the shaft portions 26a fixed to the link plates 30 rotate. Blade bodies 26b of the plurality of nozzle vanes 26 synchronously rotate together with the shaft portions 26a. In this manner, the flow passage width (so-called nozzle throat width) between adjacent blade bodies 26b in the flow passage x changes. That is, the degree of opening of the nozzle vanes 26 changes. The flow passage area of the flow passage x changes.

Figure 4A:
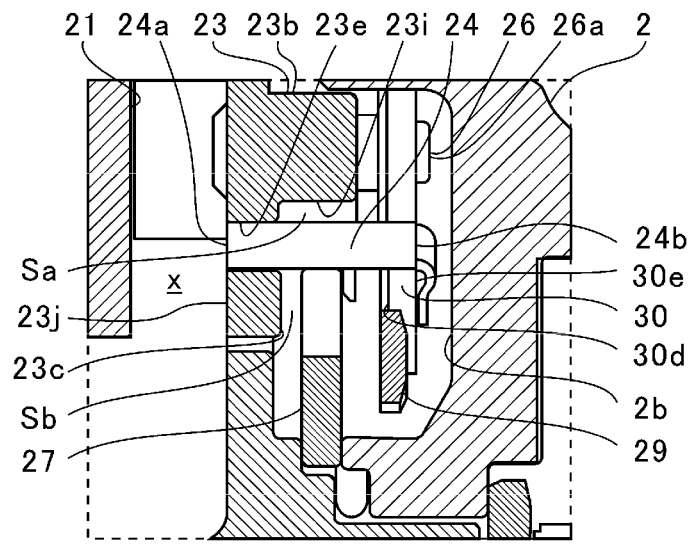
FIG. 4A is a diagram of a part enclosed by a broken line extracted from FIG. 1.
Figure 4B:
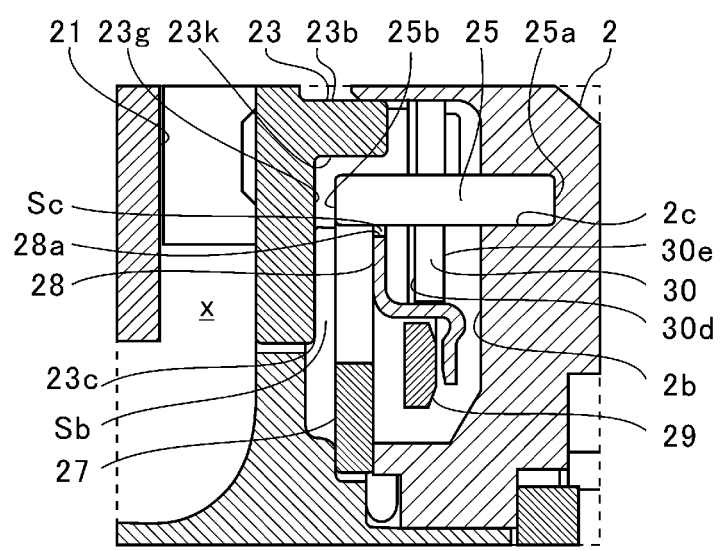
FIG. 4B is a cross-sectional view of a part corresponding to FIG. 4A having a different position in a rotation direction of a shaft.

FIG. 4A is a diagram of a part enclosed by a broken line in FIG. 1. FIG. 4B is a cross-sectional view of a part corresponding to FIG. 4A having a different position in a rotation direction of the shaft 8. As illustrated in FIGS. 4A and 4B, the nozzle ring 23 is arranged between the link plates 30 and the flow passage x.

As illustrated in FIG. 4A, one end 24a of the regulation pin 24 is press-fitted in the ring hole 23e of the nozzle ring 23 and thereby attached. A groove 23i (see FIG. 2) is formed on the outer circumferential surface 23f of the main body portion 23b. The groove 23i is positioned inward in the radial direction of the main body portion 23b with respect to the ring hole 23e. The groove 23i, that is a notch, extends in the axial direction. The position of the regulation pin 24 overlaps with that of the groove 23i in the axial direction.

The other end 24b of the regulation pin 24 protrudes from an opposing surface 30d of the link plate 30 facing the nozzle ring 23. The other end 24b of the regulation pin 24 is roughly flush with a back surface 30e opposite to the opposing surface 30d.

Furthermore, the regulation pin 24 is arranged while spaced apart from the main body portion 23b of the nozzle ring 23 outward in the radial direction. That is, a clearance Sa is formed between the regulation pin 24 and the main body portion 23b of the nozzle ring 23. The flange portion 23c of the nozzle ring 23 is arranged while spaced apart from the support ring 27 in the axial direction. A clearance Sb is formed between the flange portion 23c of the nozzle ring 23 and the support ring 27.

Figure 5:
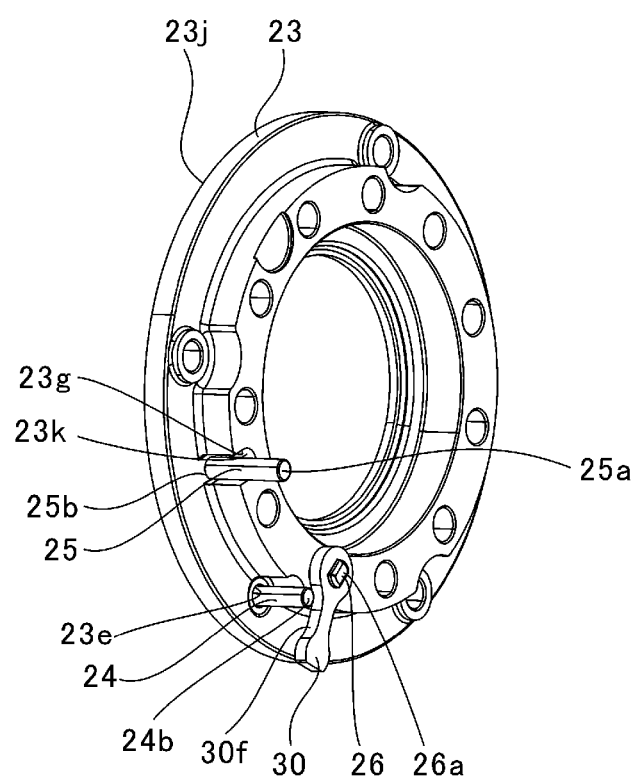
FIG. 5 is a diagram in which a nozzle ring, a regulation pin, a positioning pin, and a link plate are extracted from the nozzle drive mechanism.

FIG. 5 is a diagram in which the nozzle ring 23, the regulation pin 24, the positioning pin 25, and a link plate 30 are extracted from the nozzle drive mechanism 20. Note that illustration of link plates 30 is omitted except for the one near the regulation pin 24.

As illustrated in FIG. 5, the other end 24b of the regulation pin 24 is arranged near a link plate 30 predetermined among the plurality of link plates 30. The link plate 30 faces the regulation pin 24 in the rotation direction around the axis of the shaft portion 26a. Specifically, when the link plate 30 rotates in a direction to open around the axis of the shaft portion 26a, the link plate 30 abuts against the regulation pin 24 at a predetermined position. Therefore, the movement of the link plate 30 in the rotation direction is regulated by the regulation pin 24. In this case, the regulation pin 24 may be arranged such that the link plate 30 abuts against the regulation pin 24 at a predetermined position when the link plate 30 rotates in a direction to close around the axis of the shaft portion 26a.

Furthermore, as illustrated in FIG. 4B, an insertion hole 2c is formed in a wall portion 2b of the bearing housing 2. The wall portion 2b is positioned on a side opposite to the nozzle ring 23 across a link plate 30. The link plate 30 is arranged between the nozzle ring 23 and the wall portion 2b. In this case, one end 25a of the positioning pin 25 is, for example, press-fitted into the insertion hole 2c. As illustrated in FIGS. 4B and 5, the other end 25b of the positioning pin 25 is inserted through the positioning portion 23g. That is, the position of the positioning pin 25 overlaps with that of the positioning portion 23g in the axial direction.

The position of the positioning pin 25 in the circumferential direction of the main body portion 23b of the nozzle ring 23 is different from that of the regulation pin 24. The positioning pin 25 is positioned inward in the radial direction of the main body portion 23b with respect to the regulation pin 24. Arranging the positioning pin 25 radially inward with respect to the regulation pin 24 facilitates to avoid interference of the positioning pin 25 with respect to a water chamber of cooling water or an oil chamber of lubricating oil formed inside the bearing housing 2. In addition, arranging the positioning pin 25 radially outward with respect to the regulation pin 24 allows the regulation pin 24 to be easily arranged at a position where the regulation pin 24 comes into contact with a flat portion 30f (see FIG. 5) of a side surface of the link plate 30. By ensuring the positioning pin 25 to be in contact the flat portion 30f, it is possible to avoid that designing of the opening degree design of the nozzle vanes 26 becomes complicated. Note that the positioning pin 25 may be positioned outward in the radial direction of the main body portion 23b with respect to the regulation pin 24. The position of the positioning pin 25 in the radial direction of the main body portion 23b may be the same as that of the regulation pin 24. A part of the position of the positioning pin 25 in the radial direction of the main body portion 23b may overlap with that of the regulation pin 24.

Moreover, the positioning pin 25 is positioned inward in the radial direction of the drive ring 29. The positioning pin 25 is inserted through the drive support shaft hole 28a of the drive ring support 28. The positioning pin 25 is arranged while spaced apart radially inward from the inner circumferential surface of the drive support shaft hole 28a. A clearance Sc is formed between the positioning pin 25 and the inner circumferential surface of the drive support shaft hole 28a. Furthermore, as described above, the clearance Sb is formed between the support ring 27 and the flange portion 23c of the nozzle ring 23.

For example, in a case where an attitude of the nozzle ring 23 is misaligned relative to the bearing housing 2 in the rotation direction, the positioning portion 23g abuts against the positioning pin 25. That is, the positioning pin 25 is provided at a position where the positioning pin 25 is brought into contact when the nozzle ring 23 rotates. Therefore, the positioning pin 25 regulates rotation of the nozzle ring 23 with respect to the wall portion 2b of the bearing housing 2. The positioning pin 25 positions the nozzle ring 23 in the circumferential direction. In this manner, in the nozzle drive mechanism 20, the two pins of the regulation pin 24 and the positioning pin 25 are separately assembled.

For example, in the case where the positioning pin 25 also has the function as the regulation pin 24, it is conceivable that the other end 25b of the positioning pin 25 is press-fitted into the nozzle ring 23 like the regulation pin 24 is. In this case, since the positioning pin 25 regulates movement of the link plate 30 in the rotation direction, the positioning pin 25 is required to be arranged near the link plate 30. Therefore, it is necessary to avoid interference with the positioning pin 25 at the time of caulking the shaft portion 26a of the nozzle vane 26.

As described above, in the present embodiment, the two pins of the regulation pin 24 and the positioning pin 25 are separately provided. The regulation pin 24 does not protrude from the link plate 30 toward the bearing housing 2 (right side in FIG. 4A). Therefore, for example, at the time of performing caulking processing on the shaft portion 26a to the link plate 30, interference with a caulking tool can be prevented. Furthermore, the regulation pin 24 can be press-fitted into the nozzle ring 23 in a single state before the nozzle vanes 26 and other members are assembled to the nozzle ring 23. In this case, as described later, it is not necessary to perform management of the press-fitting load or position management of the depth at the time of press-fitting the regulation pin 24. As a result, productivity can be improved.

Moreover, the end 24a of the regulation pin 24 may be press-fitted into the ring hole 23e up to a position flush with the open surface 23j of the ring hole 23e in the nozzle ring 23. The open surface 23j is positioned on a side opposite to the link plates 30 (facing the CC plate 21).

In this case, at the time of press-fitting the regulation pin 24 into the ring hole 23e, for example, a jig or other tools having an opposing surface having a predetermined plane accuracy is used. By using this jig, the open surface 23j can be brought into contact with the opposing surface of the jig over a wide area. In this case, the regulation pin 24 can be press-fitted into the nozzle ring 23 in a stable attitude. Therefore, load management at the time of press-fitting may not be performed. The depth of press-fitting the end 24a can be determined by press-fitting the regulation pin 24 until the end 24a of the regulation pin 24 abuts on the same plane continuous with the opposing surface of the predetermined jig. Therefore, in this case, position management of the depth of press-fitting may not be performed.

Furthermore, as illustrated in FIGS. 4B and 5, an inner wall surface 23k is positioned inward in the positioning portion 23g in the radial direction of the main body portion 23b of the nozzle ring 23 with respect to the positioning pin 25. The inner wall surface 23k may be formed (spaced apart in the radial direction) with a clearance in the radial direction of the main body portion 23b from the positioning pin 25. In this case, for example, even in a case where the inner wall surface 23k is relatively displaced outward in the radial direction of the main body portion 23b due to a difference in thermal expansion between the nozzle ring 23 and the bearing housing 2 during operation, the positioning pin 25 can be prevented from abutting against the inner wall surface 23k.

Although the embodiment has been described with reference to the accompanying drawings, it is naturally understood that the present disclosure is not limited to the above embodiment. It is clear that those skilled in the art can conceive various modifications or variations within the scope described in the claims, and it is understood that they are naturally also within the technical scope.

For example, in the embodiment described above, the case where the end 24a of the regulation pin 24 is press-fitted into the ring hole 23e up to the position flush with the open surface 23j of the nozzle ring 23 has been described. However, the end 24a of the regulation pin 24 may not be positioned to be flush with the open surface 23j of the nozzle ring 23. For example, the end 24a of the regulation pin 24 may be press-fitted to the CC plate 21 side across the open surface 23j of the nozzle ring 23. The end 24a of the regulation pin 24 may be press-fitted to the middle of the ring hole 23e.

Furthermore, in the embodiment described above, the case where the surface (back surface 30e, the right side surface in FIG. 4A) of the link plate 30 opposite to the nozzle ring 23 is arranged substantially flush with the other end 24b of the regulation pin 24 has been described. However, the surface of the link plate 30 opposite to the nozzle ring 23 may not be substantially flush with the other end 24b of the regulation pin 24. The regulation pin 24 is only required to face the side surface of the link plate 30 so as to regulate rotation of the link plate 30. The other end 24b of the regulation pin 24 may be positioned at a position (right side in FIG. 4A) slightly protruding from the surface of the link plate 30 on the nozzle ring 23 side (opposing surface 30d, the left side surface in FIG. 4A). That is, as long as the other end 24b of the regulation pin 24 is positioned at a position not protruding toward the bearing housing 2 from the surface of the link plate 30 opposite to the nozzle vane 26, the other end 24b of the regulation pin 24 can be arranged at any position within a range facing the side surface of the link plate 30 depending on the material of each member, operating conditions, or other conditions.

Furthermore, in the embodiment described above, the case where the insertion hole 2c into which the positioning pin 25 is press-fitted is formed on the wall portion 2b has been described. However, without limited to the insertion hole 2c, the wall portion 2b may be formed with, for example, a groove, a notch, or the like. In this case, the positioning pin 25 is only required to abut against an inner circumferential surface such as a hole, a groove, a notch, or the like formed in the bearing housing 2 to such an extent that rotation of the nozzle ring 23 with respect to the wall portion 2b is regulated with the nozzle ring 23 assembled when the nozzle ring 23 rotates relative to the bearing housing 2 and is displaced. However, for example, by including the insertion hole 2c, the nozzle ring 23 can be stably assembled to the bearing housing 2. Furthermore, the positioning pin 25 may not be press-fitted into the insertion hole 2c but be loosely fitted therein. In this case, the positioning pin 25 may be press-fitted to the nozzle ring 23. Moreover, a clearance may be provided between one of the nozzle ring 23 and the bearing housing 2 and the positioning pin 25 radially inward or radially outward with respect to the positioning pin 25. In this case, it is possible to absorb a relative displacement due to a difference in thermal expansion between the nozzle ring 23 and the bearing housing 2 during operation according to a linear expansion coefficient of each member.

Furthermore, in the embodiment described above, the case where the positioning portion 23g is formed by a groove has been described. However, the positioning portion 23g is not limited to the groove and may be formed by, for example, a hole or a notch penetrating the main body portion 23b in the axial direction.

Furthermore, in the embodiment described above, the case where the inner wall surface 23k of the positioning portion 23g is spaced apart from the positioning pin 25 in the radial direction of the main body portion 23b has been described. However, the inner wall surface 23k may be in contact with the positioning pin 25. Furthermore, in a case where the inner wall surface 23k is spaced apart from the positioning pin 25 in the radial direction of the main body portion 23b, as long as operability of the nozzle vanes are not adversely affected, due to the difference in thermal expansion during operation, the inner wall surface 23k may be relatively displaced outward in the radial direction of the main body portion 23b, and the positioning pin 25 may slightly abut against and press the inner wall surface 23k due to the difference in thermal expansion during operation.

Furthermore, in the embodiment described above, the case where the inner wall surface 23k of the positioning portion 23g is spaced apart from the positioning pin 25 inward in the radial direction of the main body portion 23b has been described. However, depending on a linear expansion coefficient of each member, the inner wall surface 23k may be formed so as to be spaced apart from the positioning pin 25 outward in the radial direction of the main body portion 23b than the position illustrated in FIG. 4B.

Furthermore, in the embodiment described above, the case where the radial bearing 7 is provided to the bearing housing 2 has been described. However, the radial bearing 7 is not limited to the semi-floating bearing illustrated in FIG. 1. The radial bearing 7 may be any sliding bearing such as a full floating bearing or any rolling bearing such as a ball bearing.

Furthermore, in the embodiment described above, the case where the support ring 27 of a flat plate shape is provided has been described. However, for example as described in JP 2011-85054 A, a support ring may be cylindrical, and a drive ring and a guide ring may be arranged inside the support ring. In this case, a plurality of protruding pieces protruding outward in the radial direction is provided on an outer circumference of the guide ring while spaced apart from each other in the circumferential direction, and the drive ring is supported by the protruding pieces from an inner side in the radial direction. Moreover, a flange portion formed on the outer circumferential surface of the support ring is clamped between the bearing housing and the turbine housing.

Furthermore, in the embodiment described above, the case where the nozzle drive mechanism 20 is held inside the bearing housing 2 and the turbine housing 4 via the support ring 27 has been described as an example. However, a configuration for holding the nozzle drive mechanism is not limited to this and can be desirably set as appropriately.

For example, a pressing member for pressing a part of the nozzle drive mechanism against the wall surface of the bearing housing may be provided without providing the support ring, and the nozzle drive mechanism may be held in the housing in a state movable in the axial direction. In this case, for example, the pressing member is arranged to face the nozzle ring from the turbine housing side and presses the nozzle ring toward the bearing housing side. Furthermore, the pressing member may press a part of the nozzle drive mechanism against the wall surface of the turbine housing. In this case, for example, the pressing member is arranged to face the nozzle ring from the bearing housing side and presses the nozzle ring toward the turbine housing side. Furthermore, the pressing member may press the CC plate instead of the nozzle ring.

INDUSTRIAL APPLICABILITY

The present disclosure is applicable to a nozzle drive mechanism, a turbocharger, and a variable-capacity turbocharger in which a plurality of nozzle vanes is displaced by link plates.

What is claimed is:

1. A nozzle drive mechanism comprising:
   a plurality of nozzle vanes;
   a plurality of link plates each provided to a shaft portion of one of the plurality of nozzle vanes;
   a nozzle ring having an annular main body portion including shaft holes, each of which pivotally supporting a shaft portion of one of the nozzle vanes, the nozzle ring arranged between the link plates and the nozzle vanes;
   a regulation pin having one end side thereof attached to the main body portion of the nozzle ring and the other end thereof protruding from an opposing surface of one of the link plates facing the nozzle ring;
   a positioning pin provided separately from the regulation pin and assembled to a wall portion positioned opposite to the nozzle ring across the link plate at a position where the positioning pin is brought into contact when the nozzle ring rotates; and
   a ring hole penetrating through the main body portion of the nozzle ring and into which the end of the regulation pin is press-fitted to a position in the nozzle ring that is flush with an open surface positioned on a side opposite to the link plates.

2. The nozzle drive mechanism according to claim 1, further comprising:
   an insertion hole formed in the wall portion and into which the positioning pin is inserted.

3. The nozzle drive mechanism according to claim 1, further comprising:
   a positioning portion formed in the main body portion of the nozzle ring and formed by a hole or a groove through which the positioning pin is inserted, an inner wall surface of the positioning portion positioned inward in a radial direction of the main body portion with respect to the positioning pin is spaced apart from the positioning pin.

4. The nozzle drive mechanism according to claim 2, further comprising:
   a positioning portion formed in the main body portion of the nozzle ring and formed by a hole or a groove through which the positioning pin is inserted, an inner wall surface of the positioning portion positioned inward in a radial direction of the main body portion with respect to the positioning pin is spaced apart from the positioning pin.

5. A turbocharger comprising the nozzle drive mechanism according to claim 1.

6. A turbocharger comprising the nozzle drive mechanism according to claim 2.

7. A turbocharger comprising the nozzle drive mechanism according to claim 3.

8. A turbocharger comprising the nozzle drive mechanism according to claim 4.

9. A variable-capacity turbocharger comprising:
   a nozzle drive mechanism having a plurality of nozzle vanes and a plurality of link plates each fixed to a shaft portion of one of the plurality of nozzle vanes;
   an annular main body portion including shaft holes, each of which pivotally supporting a shaft portion of one of the nozzle vanes;
   a nozzle ring arranged between the link plates and the nozzle vanes;
   a regulation pin having one end fixed to the main body portion of the nozzle ring and the other end protruding from an opposing surface of one of the link plates facing the nozzle ring;
   a positioning pin provided separately from the regulation pin and assembled to a wall portion, of a housing, positioned opposite to the nozzle ring across the link plate at a position where the positioning pin is brought into contact when the nozzle ring rotates;
   a housing hole formed in the wall portion and into which the positioning pin is inserted; and
   a ring hole penetrating through the main body portion of the nozzle ring and into which the end of the regulation pin is press-fitted to a position in the nozzle ring that is flush with an open surface positioned on a side opposite to the link plates.

* * * * *